(12) United States Patent
Smirnov (10) Patent No.: US 11,041,749 B1
(45) Date of Patent: Jun. 22, 2021

(54) MULTI-GAS MASS FLOW CONTROLLER AND METHOD

(71) Applicant: Hitachi Metals, Ltd., Tokyo (JP)

(72) Inventor: Alexei V. Smirnov, Fort Collins, CO (US)

(73) Assignee: Hitachi Metals, Ltd., Tokyo (JP)

(*) Notice: Subject to any disclaimer, the term of this patent is extended or adjusted under 35 U.S.C. 154(b) by 54 days.

(21) Appl. No.: 16/720,891

(22) Filed: Dec. 19, 2019

(51) Int. Cl.
*F16K 31/02* (2006.01)
*G01F 25/00* (2006.01)
*G05D 7/06* (2006.01)
*G01F 1/86* (2006.01)

(52) U.S. Cl.
CPC ....... *G01F 25/0007* (2013.01); *G05D 7/0629* (2013.01); *G01F 1/86* (2013.01)

(58) Field of Classification Search
CPC ...... G01F 25/0007; G01F 1/86; G05D 7/0629
USPC ............ 137/2, 487.5, 486; 73/202.5, 204.11, 73/861.02; 700/282
See application file for complete search history.

(56) References Cited

U.S. PATENT DOCUMENTS

| | | | |
|---|---|---|---|
| 5,062,446 A | 11/1991 | Anderson | |
| 5,321,992 A | 6/1994 | Mudd et al. | |
| 5,911,238 A | 6/1999 | Bump et al. | |
| 5,944,048 A * | 8/1999 | Bump | G01F 1/86 137/487.5 |
| 6,962,164 B2 | 11/2005 | Lull et al. | |
| 7,043,374 B2 | 5/2006 | Wang et al. | |
| 7,273,063 B2 | 9/2007 | Lull et al. | |
| 8,036,780 B2 * | 10/2011 | Gotoh | G05D 7/0635 700/282 |
| 8,131,400 B2 * | 3/2012 | Smirnov | G05D 7/0635 700/282 |
| 8,196,601 B2 * | 6/2012 | Smirnov | G01F 5/00 137/468 |
| 8,915,262 B2 * | 12/2014 | Smirnov | G05D 7/0635 137/486 |
| 9,223,318 B2 * | 12/2015 | Takeuchi | G05D 7/0652 |
| 9,823,667 B2 * | 11/2017 | Takijiri | G05D 7/0635 |
| 10,048,105 B2 * | 8/2018 | Valentine | G01F 1/88 |
| 10,473,500 B2 * | 11/2019 | Smirnov | G01F 15/002 |
| 10,508,943 B2 * | 12/2019 | Sasaki | G01F 1/696 |

(Continued)

FOREIGN PATENT DOCUMENTS

JP H0719917 A 1/1995

OTHER PUBLICATIONS

Matsumoto, Yasunori, "International Search Report and Written Opinion Regarding International Application No. PCT/JP2020/044766", dated Mar. 2, 2021, p. 8 Published in: JP.

*Primary Examiner* — Minh Q Le
(74) *Attorney, Agent, or Firm* — Neugeboren O'Dowd PC (57) ABSTRACT

Mass flow controllers and methods for controlling mass flow controllers are disclosed. One method includes providing a process gas through a flow sensor of the mass flow controller, obtaining a gas-adjusted sensitivity coefficient for the flow sensor, and obtaining gas-adjusted nonlinearity data for the flow sensor. The method also includes producing gas-adjusted characterization data for the flow sensor using the gas-adjusted sensitivity coefficient and the gas-adjusted nonlinearity data. A flow value from the gas-adjusted characterization data is obtained using a flow sensor signal from the flow sensor, and the flow value is used along with a setpoint signal to control a valve of the mass flow controller.

8 Claims, 10 Drawing Sheets

(56) References Cited

U.S. PATENT DOCUMENTS

| | | | |
|---|---|---|---|
| 2011/0247390 A1 | 10/2011 | Smirnov et al. | |
| 2011/0247696 A1* | 10/2011 | Zolock | G05D 7/0635 137/2 |
| 2012/0186655 A1* | 7/2012 | Smirnov | G05D 7/0635 137/1 |
| 2013/0146148 A1* | 6/2013 | Smirnov | F17D 1/16 137/13 |
| 2014/0246097 A1* | 9/2014 | Smirnov | G05D 7/0635 137/10 |
| 2014/0260513 A1* | 9/2014 | Smirnov | G01F 25/0007 73/1.34 |
| 2019/0331515 A1* | 10/2019 | Smirnov | G01F 25/0053 |
| 2021/0003438 A1* | 1/2021 | Okano | G01F 1/69 |

* cited by examiner

MULTI-GAS MASS FLOW CONTROLLER AND METHOD

BACKGROUND

Field

The present invention relates to mass flow sensors and mass flow controllers, and in particular, but not by way of limitation, the present invention relates to improving an accuracy of mass flow sensors.

Background

A typical mass flow controller (MFC) is a device that sets, measures, and controls the flow of a gas in industrial processes such as thermal and dry etching among other processes. An important part of an MFC is a thermal flow sensor that measures the mass flow rate of the gas flowing through the device.

As opposed to an idealized flow sensor signal (that has a perfect linear dependence upon a mass flow rate of the gas) a flow sensor signal that is output by a thermal flow sensor is non-linear relative to an actual flow rate of the fluid: a sensitivity of the thermal flow sensor drops at higher flow rates. In other words, sensitivity of the flow sensor signal to the flow is not constant—it decreases with increasing flow. As used herein, sensitivity refers to the ratio of the flow sensor signal to the mass flow rate of the gas being measured.

In a typical mass flow controller, the nonlinearity of the thermal flow sensor is characterized with a characterization gas, and then stored as characterization data in a memory of the MFC in the form of a table. Then, a flow signal from the thermal flow sensor is adjusted using the characterization data to provide a measured flow rate.

When a process gas is controlled, the characterization data is adjusted with live gas data for the process gas, but the adjustment does not account for differences (between the thermal flow sensors of each mass flow controller). For example, many physical aspects such as sensor construction and voltage adjustment may vary between thermal flow sensors, and applying the adjustment to the characterization data results in incorrect flow measurements.

Accordingly, a need exists for a method and/or apparatus to provide new and innovative features that address the shortfalls of present methodologies in multi-gas nonlinearity adjustment to a flow signal.

SUMMARY

An aspect may be characterized as a method for controlling a mass flow controller that includes providing a process gas through a flow sensor of the mass flow controller, obtaining a gas-adjusted sensitivity coefficient for the flow sensor, and obtaining gas-adjusted nonlinearity data for the flow sensor. The method also includes producing gas-adjusted characterization data for the flow sensor using the gas-adjusted sensitivity coefficient and the gas-adjusted nonlinearity data. A flow value from the gas-adjusted characterization data is obtained using a flow sensor signal from the flow sensor, and the flow value is used along with a setpoint signal to control a valve of the mass flow controller.

Another aspect may be characterized as a mass flow controller that includes a main flow path for a gas, a control valve to control a flow rate of the gas through the main flow path, and a flow sensor coupled to the main flow path to provide a flow sensor signal indicative of a mass flow rate of the gas. A sensitivity adjustment module is configured to adjust a sensitivity coefficient with a conversion factor for a process gas to produce a gas-adjusted sensitivity coefficient for the flow sensor. A nonlinearity adjustment module of the mass flow controller is configured to adjust nonlinearity data associated with a characterization gas for the flow sensor with a nonlinearity factor for the process gas to produce gas-adjusted nonlinearity data. A characterization module is configured to produce gas-adjusted characterization data for the flow sensor using the gas-adjusted sensitivity coefficient and the gas-adjusted nonlinearity data, and the characterization module is configured to obtain a flow value from the gas-adjusted characterization data using a flow sensor signal from the flow sensor. A controller of the mass flow controller is configured to use the flow value along with a setpoint signal to control a valve of the mass flow controller.

DETAILED DESCRIPTION

Figure 1:
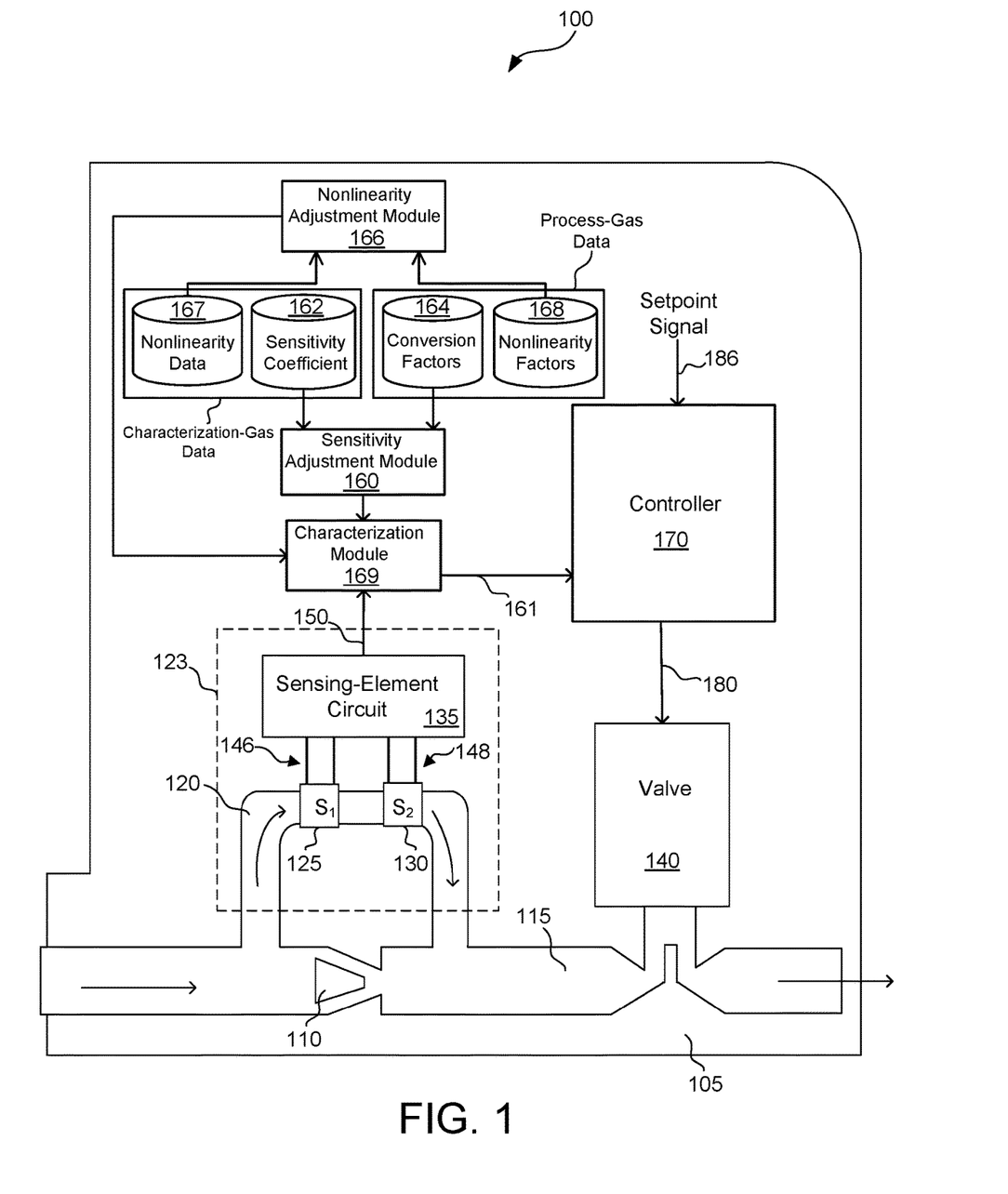
FIG. 1 is a block diagram of a mass flow controller (MFC) that incorporates improved methodologies for multi-gas nonlinearity adjustment to a flow sensor signal.

Referring now to the drawings, FIG. 1 illustrates a mass flow controller (MFC) 100 that incorporates methodologies to improve measurement and control accuracy across multiple gas types. The illustrated arrangement of these components is logical and not meant to be an actual hardware diagram. Thus, the components can be combined, further separated, deleted and/or supplemented in an actual implementation. As one of ordinary skill in the art will appreciate, the components depicted in FIG. 1 may be implemented in hardware, or hardware in combination with firmware and/or software. Moreover, in light of this specification, the construction of each individual component will be well known within the skill of those of ordinary skill in the art.

Throughout this disclosure, examples and embodiments are described in terms of gases being controlled, but it should be recognized that the examples and embodiments are generally applicable to fluids that may be gases or liquids, and the fluids may include a mixture of elements and/or compounds. A liquid for example may be sulfuric acid and a gas may be nitrogen. Depending upon the application, the MFC 100 may deliver a fluid in a gaseous state (e.g., nitrogen) and/or a liquid state (e.g., hydrochloric acid) to, for example, a tool in a semiconductor facility. The MFC 100 in many embodiments is configured to deliver different types of fluids under varying temperatures and pressures to different types of containers or vessels.

As depicted, a base 105 of the MFC 100 includes bypass 110 through which a gas flows. Bypass 110 directs a constant proportion of gas through a main path 115 and sensor tube 120. As a consequence, the flow rate of the gas through the sensor tube 120 is indicative of the flow rate of the gas flowing through the main path 115 of the MFC 100.

In this embodiment, the sensor tube 120 is a small-bore tube that is part of a flow sensor 123 of the MFC 100. And as shown, sensing elements 125 and 130 are coupled to (e.g., wound around) the outside of sensor tube 120. In one illustrative embodiment, sensing elements 125 and 130 are resistance-thermometer elements (e.g., coils of conductive wire), but other types of sensors (e.g., resistance temperature detectors (RTD) and thermocouples) may also be utilized. Moreover, other embodiments may certainly utilize different numbers of sensors and different architectures for processing the signals from the sensors without departing from the scope of the present invention.

As depicted, sensing elements 125 and 130 are electrically connected to a sensing-element circuit 135. In general, the sensing-element circuit 135 is configured (responsive to signals 146, 148 from the sensing elements 125, 130) to provide a flow sensor signal 150, which is indicative of the flow rate through the sensor tube 120, and hence, indicative of the flow rate through the main path 115 of the MFC 100.

Figure 4:
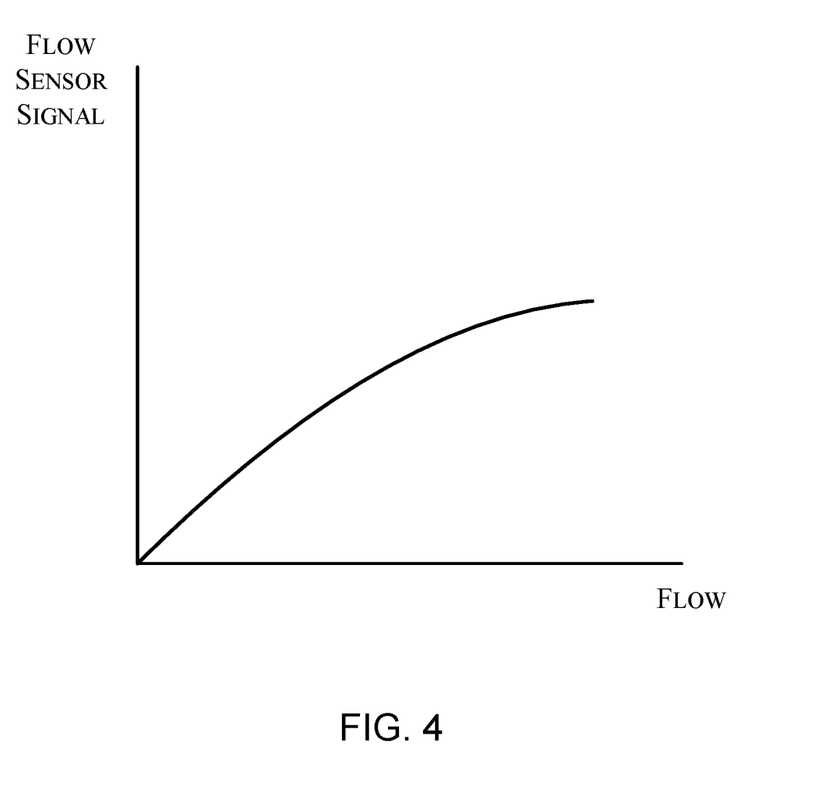
FIG. 4 is a graph depicting characterization data for a flow sensor in connection with a characterization gas.

The flow sensor signal 150 is defined by a temperature profile along the sensor tube 120 that affects a temperature difference between the sensing elements 125, 130. The flow sensor signal 150 is non-linear relative to the flow rate through the sensor tube 120 across a range of flow rates: the sensitivity of the flow sensor signal 150 decreases at higher flow rates (as compared to lower flow rates). Referring briefly to FIG. 4 for example, depicted is exemplary characterization data for the flow sensor 123 in terms of the flow sensor signal 150 and a mass flow rate of a fluid through the flow sensor 123 for a characterization gas such as nitrogen. As shown in FIG. 4, the exemplary characterization data indicates that the sensitivity of the flow sensor 123 decreases at higher flow rates (as compared to lower flow rates).

The characterization data depicted in FIG. 4 may be produced during a characterization process before the mass flow controller 100 is released to customers. The characterization process may include, for example, causing a gas to flow through the flow sensor 123; measuring the flow rate of the gas with a precision mass flow meter (not shown) for multiple flow rates across a range of flow rate values from 0% to 100% of the operating range of the flow sensor 123; and obtaining values of the flow sensor signal 150 for each of the measured flow rates. The characterization data (for the flow sensor 123 in connection with a characterization gas) may be represented by: $\{(f_i, y_i)|i=1, 2, \ldots, n\}$ where $f_i$ are flow values and $y_i$ are signal values.

As discussed above, in a typical mass flow controller, the nonlinearity of the flow sensor 123 may be characterized with a characterization gas, and then stored as the characterization data in a memory of the MFC 100 in the form of a table. Then, the flow sensor signal 150 from the flow sensor 123 may be adjusted using the characterization data to provide a measurement of the flow rate. The characterization data may be adjusted with live gas data for the process gas, but in prior art approaches, the adjustment does not account for differences between the thermal flow sensors of each different mass flow controller. For example, many physical aspects such as sensor construction and voltage adjustment may vary between thermal flow sensors, and applying the adjustment to the characterization data results in incorrect flow measurements and inaccurate mass flow control.

An aspect of the present disclosure is that the flow sensor 123 is characterized in terms of two operational aspects of the flow sensor 123, and each of these two aspects may be adjusted based upon the process gas that is measured and controlled. More specifically, the characterization data depicted in FIG. 4 is separated into two portions: 1) an ideal signal portion (which may be represented as a sensitivity coefficient 162); and 2) a non-linear portion (which may be stored as nonlinearity data 167 and represented as difference values between ideal signal data and the characterization data of FIG. 4).

Figure 2:
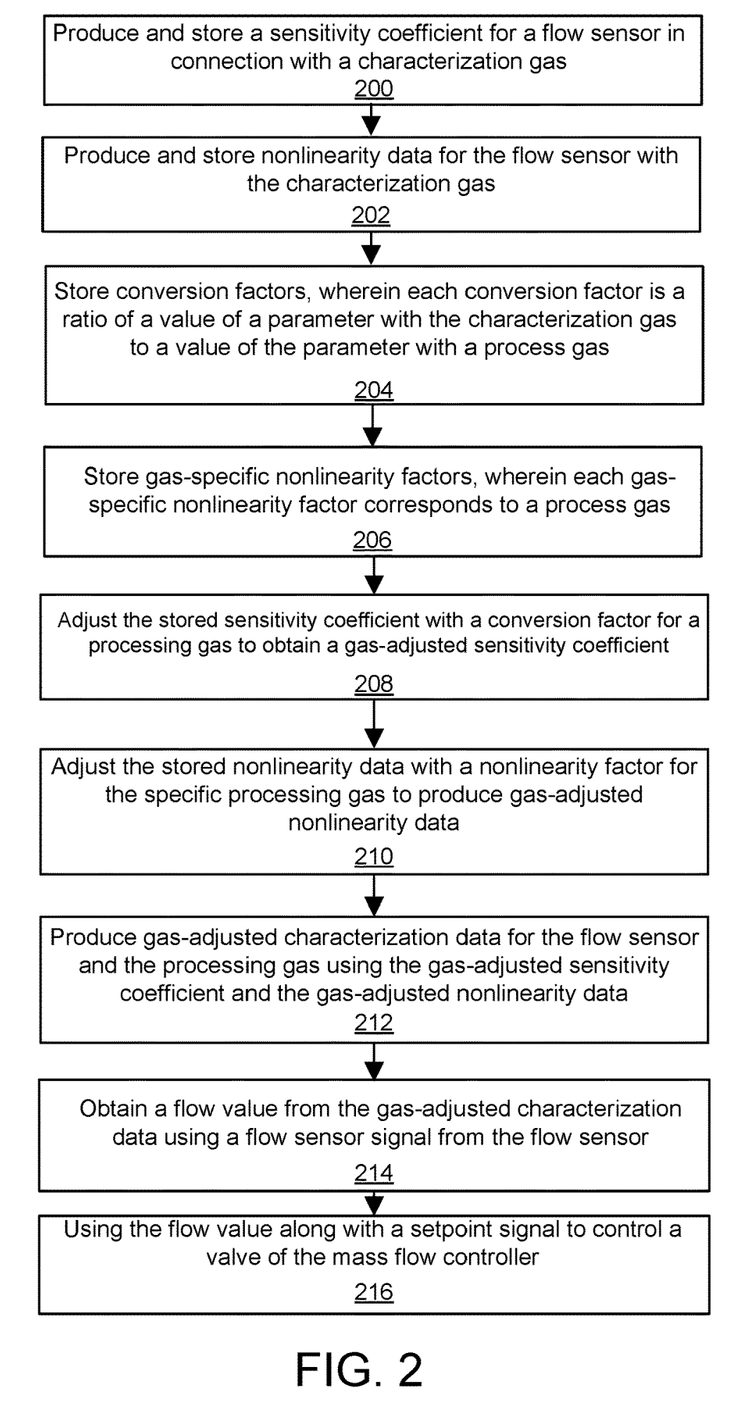
FIG. 2 is a is a flowchart depicting an exemplary method that may be traversed in connection with embodiments disclosed herein.
Figure 5:
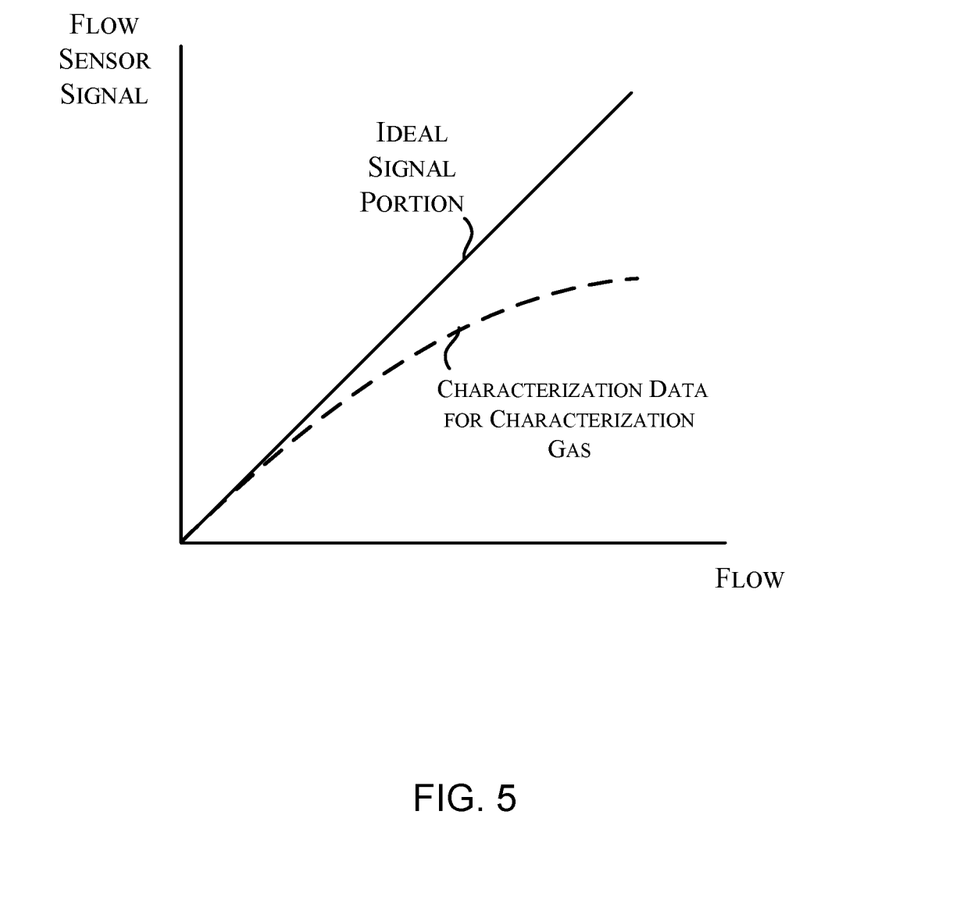
FIG. 5 is a graph depicting an ideal linear signal for the flow sensor in connection with a characterization gas.
Figure 6:
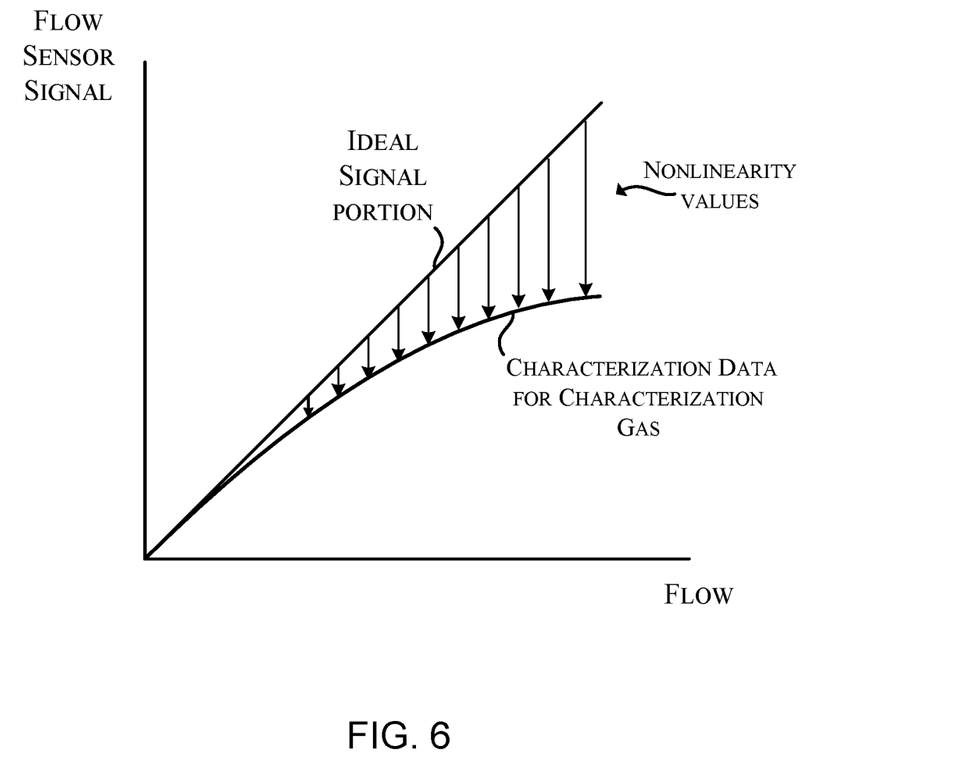
FIG. 6 is a graph depicting creation of nonlinearity data for the flow sensor.
Figure 7:
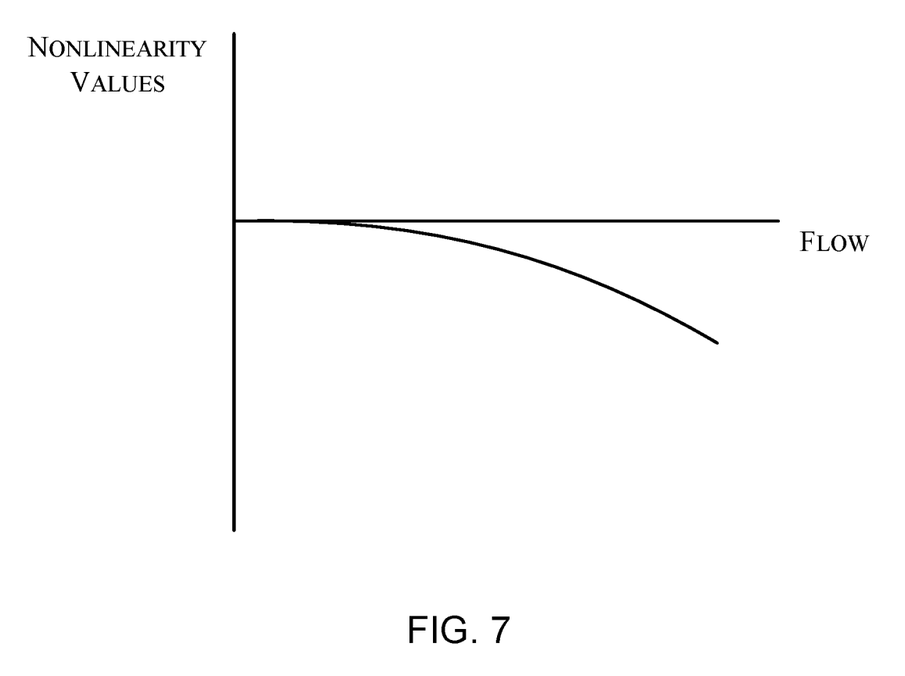
FIG. 7 is a graph depicting exemplary nonlinearity data for the flow sensor in connection with a characterization gas.

Referring to FIG. 2, shown is a flowchart depicting a method for providing improved measurement and control accuracy across multiple gas types. As shown, the sensitivity coefficient 162 for the flow sensor 123 may be produced and stored in the MFC 100 as a representation of the ideal signal portion of the characterization data (Block 200). In addition, the nonlinearity data 167 for the flow sensor 123 may be produced and stored in the MFC 100 as a representation of the nonlinear portion of the characterization data (Block 202). FIGS. 5-7 collectively depict an exemplary approach to breaking the characterization data into the ideal signal portion and the nonlinear portion. As shown in FIG. 1, the nonlinearity data 167 and sensitivity coefficient 162 are stored as characterization-gas data for the flow sensor 123.

Referring to FIG. 5 shown is a graph depicting an exemplary ideal signal portion for a characterization gas that represents an ideal flow sensor signal that is linear. The ideal signal portion (also referred to as an ideal signal) may be represented by a single value as a sensitivity coefficient (SC) that is a ratio of the ideal flow sensor signal and the mass flow rate at any point along the line that represents the ideal signal. The flow sensor 123 does not actually output the ideal signal portion in a range of mass flow values (that the mass flow controller 100 is designed to control) as shown in FIG. 5, but at very low flow values, the flow sensor 123 does operate in a linear manner. As a consequence, the ideal signal portion may be created by sampling the flow sensor signal 150 at low flow values to obtain the sensitivity coefficient, and the sensitivity coefficient may be used to calculate ideal signal values at higher flow rates. Each ideal signal value of the ideal signal portion may be represented by $s_i = SC * f_i$ where SC is the sensitivity coefficient and $f_i$ are the flow values where $i=1, 2, \ldots, n$.

As shown in FIG. 6, nonlinearity data may be created by obtaining a difference between each of multiple ideal signal values, $s_i$, of the ideal signal portion and corresponding signal values of the characterization data, $y_i$, for the characterization gas. The nonlinearity data may be represented as: $\{(f_i, z_1)|i=1, 2, \ldots, n\}$ where $f_i$ are flow values, $z_i$ are nonlinearity values associated with flow values for the characterization gas, where each of the nonlinearity values, $z_i$, is equal to $s_i$ minus $y_i$. FIG. 7 is a depiction the resultant non-linearity data. Thus, the flow sensor 123 may be characterized in terms of the sensitivity coefficient 162 and nonlinearity data 167 for the flow sensor 123.

Consistent with this approach, FIG. 1 depicts a stored sensitivity coefficient 162 and stored nonlinearity data 167 for the flow sensor 123. As discussed above, the stored sensitivity coefficient 162 and the stored nonlinearity data 167 may be created during the characterization process and stored in the MFC 100 before the MFC 100 is released for use.

Characterizing the flow sensor 123 of the MFC 100 in terms of an ideal signal portion (e.g., the sensitivity coefficient 162) and a non-linear portion (e.g., the nonlinearity data 167) enable these two operational aspects to be separately adjusted based upon the type of process gas that is used.

In addition, conversion factors, CFs, are stored in the MFC 100 to produce stored conversion factors 164 (Block 204). Each of the conversion factors 164 is a ratio of a value for some particular parameter associated with the characterization gas to a value for the particular parameter associated with a process gas. For example, each of the conversion factors may represent, for a particular flow value, a ratio of an ideal signal value for a characterization gas to an ideal signal value for a particular process gas. With an accepted degree of accuracy, each of the conversion factors may represent a ratio of a heat capacity of the characterization gas to a heat capacity for the processing gas.

In addition, gas-specific nonlinearity factors (NLFs) are stored in the MFC to produce stored nonlinearity factors 168 (Block 206). The nonlinearity factors may be derived empirically or experimentally (e.g., from live gas measurements).

Figure 8:
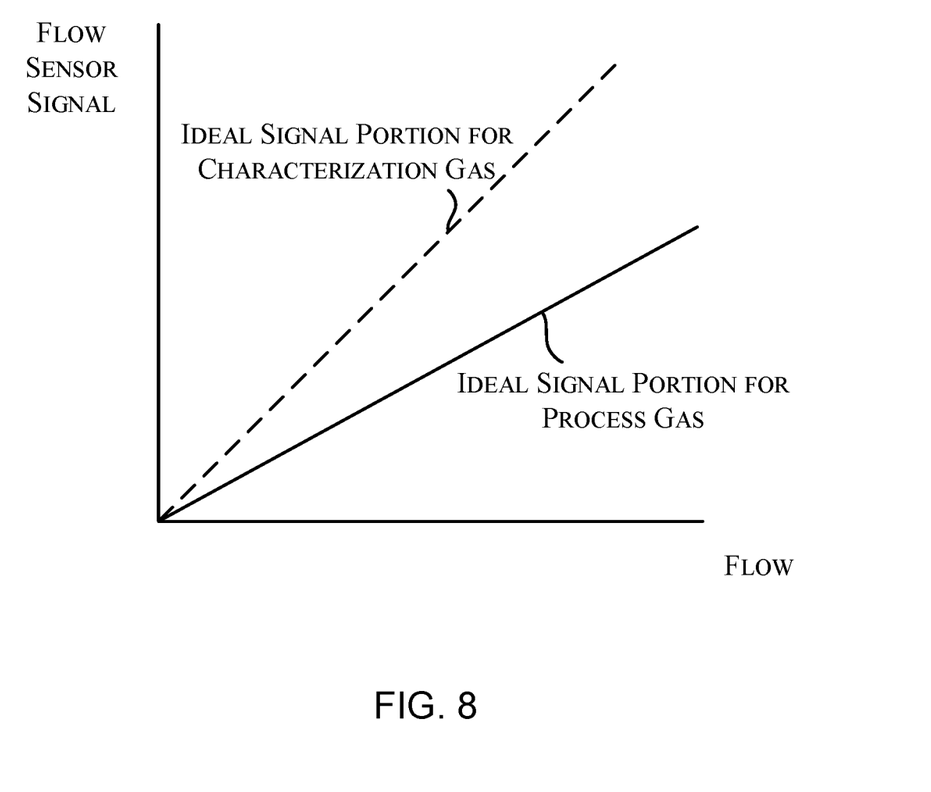
FIG. 8 is a graph depicting an ideal signal for the flow sensor in connection with a process gas.

The steps described with reference to Blocks 200 to 206 may be performed during a characterization process that is carried out before the MFC 100 is released for use to the end user. During operation, to adjust for the control of a flow rate of a process gas, the ideal signal portion of the characterization data (e.g., the stored sensitivity coefficient 162) and the nonlinear portion (e.g., the nonlinearity data 167) of the characterization data are adjusted. More specifically, the stored sensitivity coefficient 162 is adjusted by the sensitivity adjustment module 160 with one of the conversion factors (for the processing gas) 164 to obtain a gas-adjusted sensitivity coefficient (GASC)(Block 208). As discussed above, the sensitivity coefficient represents an ideal signal portion of the characterization data for the flow sensor 123, and the gas-adjusted sensitivity coefficient may be obtained by dividing the sensitivity coefficient by the conversion factor for the process gas (GASC=SC/CF). FIG. 8 shows a representation of the ideal signal portion for the characterization gas and a representation of the ideal signal portion for a process gas.

Figure 9:
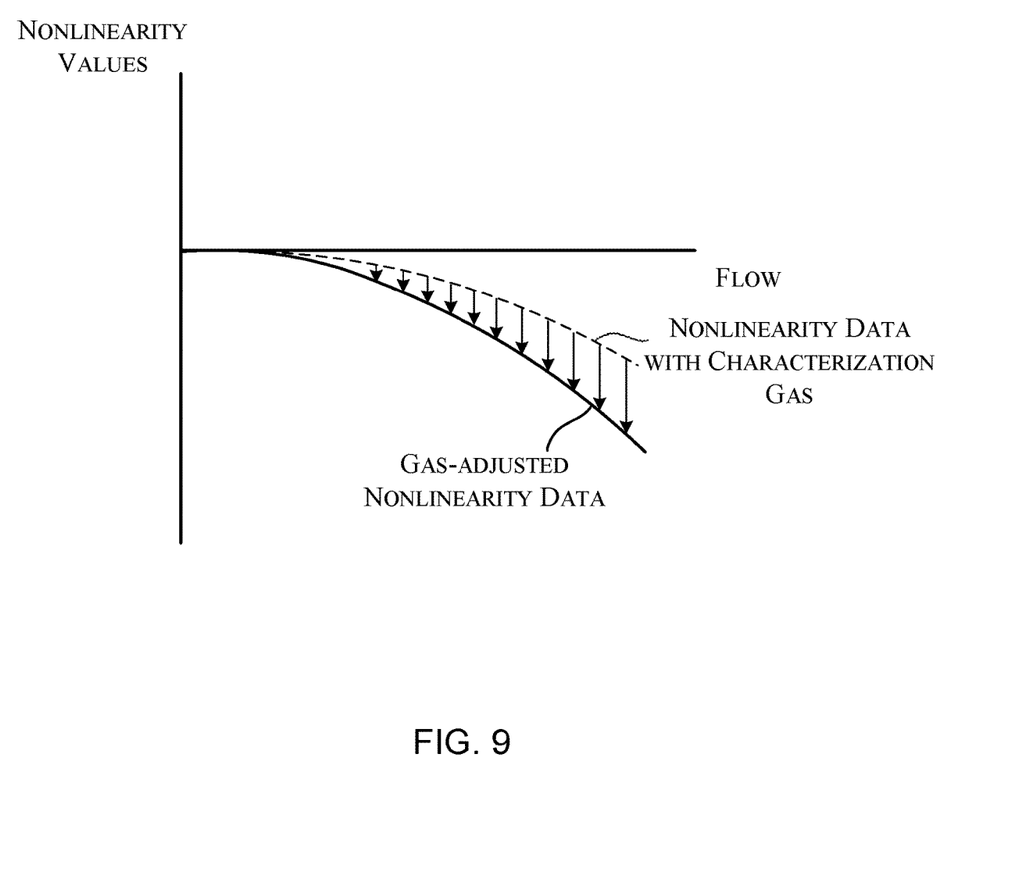
FIG. 9 is a graph depicting an adjustment of the nonlinearity data in FIG. 7 to produce gas-adjusted nonlinearity data for the flow sensor in connection with a process gas.

In addition, a nonlinearity adjustment module 166 adjusts the stored nonlinearity data 167 with one of the nonlinearity factors 168 for the process gas to produce gas-adjusted nonlinearity data (GANL)(Block 210). FIG. 9 shows the adjustment of nonlinearity data for the characterization gas to produce the gas-adjusted characterization data. The gas-adjusted characterization data may be represented as nonlinearity values for the process gas.

Figure 10:
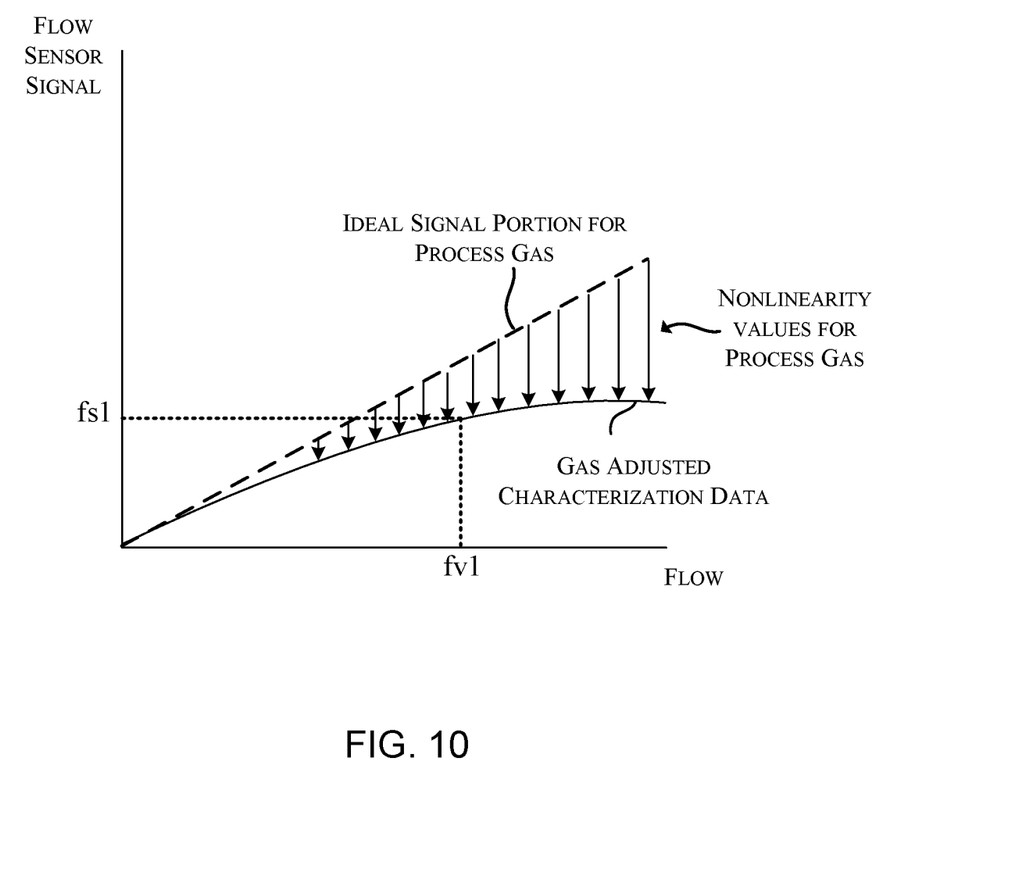
FIG. 10 is a graph depicting creation of gas-adjusted characterization data for the flow sensor.

As shown, gas-adjusted characterization data (GACD) for the flow sensor 123 and the process gas may be produced by the characterization module 169 using the gas-adjusted sensitivity coefficient (GASC) and the nonlinearity values of the gas-adjusted nonlinearity data (GANL)(Block 212). FIG. 10 graphically depicts the production of the gas-adjusted characterization data. The gas-adjusted characterization data may be represented by: $\{(f_i, s_i/CF+NLF^*z_i)|i=1, 2, \ldots, n\}$ where CF is the conversion factor for the process gas and NLF is the gas-specific nonlinearity factor.

In operation, the flow sensor 123 outputs the flow sensor signal 150 in response to a gas flowing through the mass flow controller 100, and a flow value from the gas-adjusted characterization data (GACD) is obtained using the flow sensor signal 150 from the flow sensor 123 (Block 214). In FIG. 10, for example, a flow sensor signal 150 with a value of fs1 corresponds to a flow value with a value of fv1. The obtained flow value along with a setpoint signal 186 is used to control the valve 140 of the mass flow controller 100. In particular, the flow value is represented by the measured flow signal 161, and the setpoint signal 186 represents a desired mass flow rate, so the controller 170 controls the valve 140 until the flow value is equal to the desired mass flow rate.

Although not shown for clarity, it should be recognized that the characterization module 169 may amplify and convert, using an analog to digital converter, the flow sensor signal 150 to a digital representation of the flow sensor signal 150. The digital representation of the flow sensor signal 150 may be used to obtain the flow value corresponding to the flow sensor signal 150, and the characterization module 169 may output the measured flow signal 161 as a digital signal that represents the obtained flow rate.

The valve 140 may be realized by a piezoelectric valve or solenoid valve, and the control signal 180 may be a voltage (in the case of a piezoelectric valve) or current (in the case of a solenoid valve).

Figure 3:
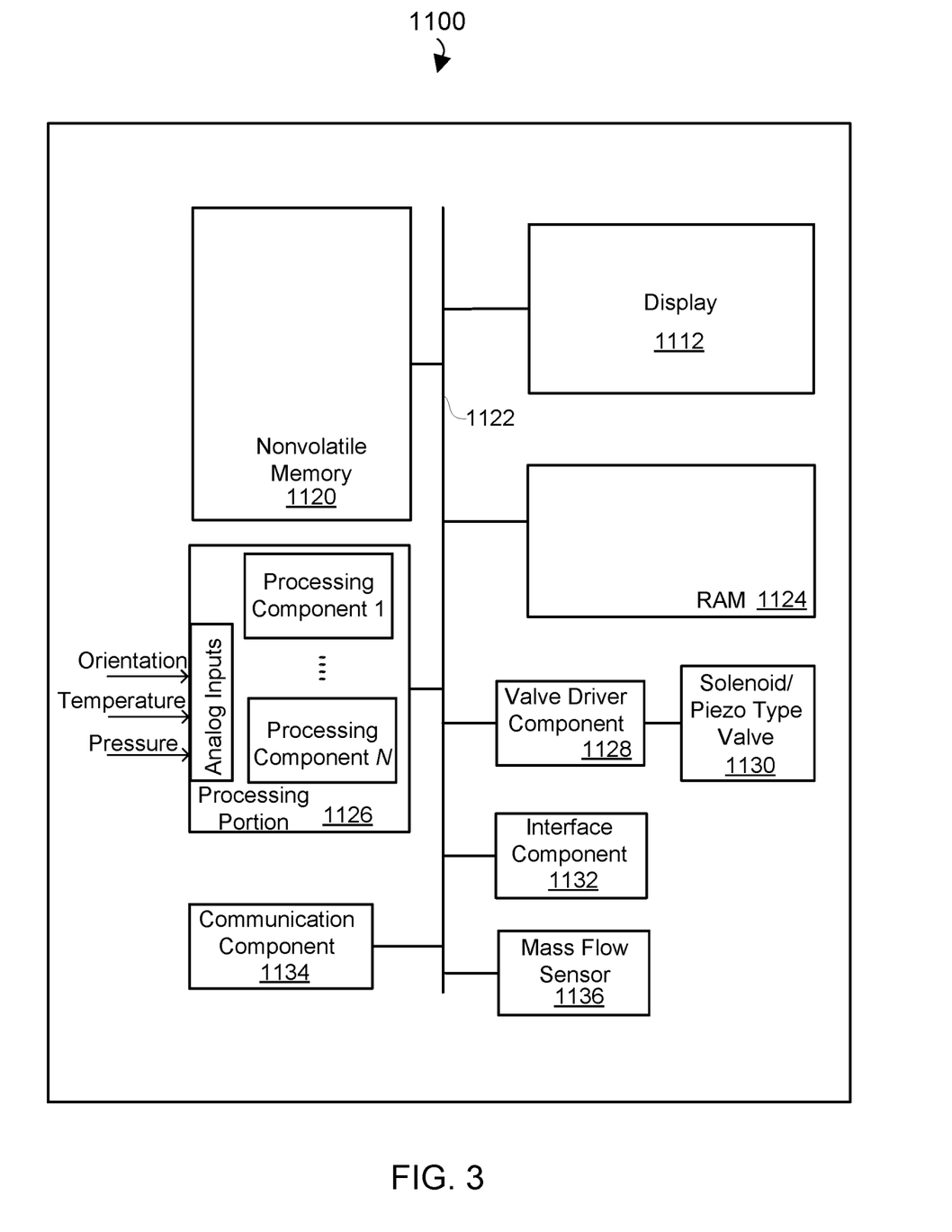
FIG. 3 is a block diagram depicting physical components of an MFC that may be used to realize aspects of the MFC depicted in FIG. 1.

Referring next to FIG. 3, shown is a block diagram 1100 depicting physical components that may be utilized to realize the MFC 100 described with reference to FIG. 1. As shown, a display 1112 and nonvolatile memory 1120 are coupled to a bus 1122, and the bus 1122 is also coupled to random access memory ("RAM") 1124, a processing portion (which includes N processing components) 1126, a valve driver component 1128 that is in communication with a solenoid or piezo type valve 1130, an interface component 1132, a communication component 1134, and a mass flow sensor 1136. Although the components depicted in FIG. 3 represent physical components, FIG. 3 is not intended to be a hardware diagram; thus, many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

The display 1112 generally operates to provide a presentation of content to a user, and in several implementations, the display is realized by an LCD or OLED display. For example, the display 1112 may provide an indicated flow as a graphical or numeric representation of the measured flow signal 161. In general, the nonvolatile memory 1120 functions to store (e.g., persistently store) data and executable code including code that is associated with the functional components depicted in FIG. 1. In some embodiments for example, the nonvolatile memory 1120 includes bootloader code, software, operating system code, file system code, and code to facilitate the implementation of one or more portions of the modules discussed in connection with FIG. 1.

In many implementations, the nonvolatile memory 1120 is realized by flash memory (e.g., NAND or ONENAND memory), but it is certainly contemplated that other memory types may be utilized. Although it may be possible to execute the code from the nonvolatile memory 1120, the executable code in the nonvolatile memory 1120 is typically loaded into RAM 1124 and executed by one or more of the N processing components in the processing portion 1126. As shown, the processing portion 1126 may receive analog temperature and pressure inputs that are utilized by the functions carried out by the controller 170. The N processing components in connection with RAM 1124 generally operate to execute the instructions stored in nonvolatile memory 1120 to effectuate the functional components depicted in FIG. 1.

The interface component 1132 generally represents one or more components that enable a user to interact with the MFC 100. The interface component 1132, for example, may include a keypad, touch screen, and one or more analog or digital controls, and the interface component 1132 may be used to translate an input from a user into the setpoint signal 186. And the communication component 1134 generally enables the MFC 100 to communicate with external networks and devices including external processing tools. For example, an indicated flow may be communicated to external devices via the communication component 1134. One of ordinary skill in the art will appreciate that the communication component 1134 may include components (e.g., that are integrated or distributed) to enable a variety of wireless (e.g., WiFi) and wired (e.g., Ethernet) communications.

The mass flow sensor 1136 depicted in FIG. 3 depicts a collection of components known to those of ordinary skill in the art to realize the flow sensor 123 shown in FIG. 1. These components may include sensing elements, amplifiers, analog-to-digital conversion components, and filters.

Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling a mass flow controller, the method comprising:
    providing a process gas through a flow sensor of the mass flow controller;
    obtaining a gas-adjusted sensitivity coefficient for the flow sensor;
    obtaining gas-adjusted nonlinearity data for the flow sensor;
    producing gas-adjusted characterization data for the flow sensor using the gas-adjusted sensitivity coefficient and the gas-adjusted nonlinearity data;
    obtaining a flow value from the gas-adjusted characterization data using a flow sensor signal from the flow sensor; and
    using the flow value along with a setpoint signal to control a valve of the mass flow controller.

2. The method of claim 1, wherein obtaining the gas-adjusted sensitivity coefficient includes:
    retrieving a sensitivity coefficient for the flow sensor, the sensitivity coefficient representing an ideal signal of the flow sensor when the flow sensor is used with a characterization gas;
    retrieving a conversion factor for the process gas from a memory of the mass flow controller; and
    adjusting the sensitivity coefficient with the conversion factor to obtain the gas-adjusted sensitivity coefficient.

3. The method of claim 2, wherein obtaining the gas-adjusted nonlinearity data for the flow sensor includes:
    retrieving nonlinearity data associated with characterization gas for the flow sensor;
    retrieving a nonlinearity factor for the process gas from a memory of the mass flow controller; and
    adjusting the nonlinearity data for the flow sensor with the nonlinearity factor for the process gas to obtain the gas-adjusted nonlinearity data, wherein the nonlinearity data is previously produced in connection with a characterization gas.

4. The method of claim 1, wherein the gas-adjusted sensitivity coefficient is produced by:
    obtaining a sensitivity coefficient for a characterization gas and dividing the sensitivity coefficient for the characterization gas by a conversion factor for the process gas.

5. The method of claim 1, wherein:
    the gas-adjusted characterization data is represented by: $\{(f_i, s_i/CF+NLF*z_i)|i=1, 2, \ldots, n\}$ where CF is a conversion factor for the process gas, NLF is a gas-specific nonlinearity factor, $s_i=SC*f_i$ where $f_i$ are flow values, $z_i$ are nonlinearity values equal to $s_i$ minus $y_i$ where $y_i$ are signal values of characterization data for a characterization gas, the characterization data represented by: $\{(f_i,y_i)|i=1, 2, \ldots, n\}$.

6. A mass flow controller comprising:
    a main flow path for a gas;
    a control valve to control a flow rate of the gas through the main flow path;
    a flow sensor coupled to the main flow path to provide a flow sensor signal indicative of a mass flow rate of the gas;
    a sensitivity adjustment module configured to adjust a sensitivity coefficient with a conversion factor for a process gas to produce a gas-adjusted sensitivity coefficient for the flow sensor, the sensitivity coefficient representing an ideal signal of the flow sensor when the flow sensor is used with a characterization gas;
    a nonlinearity adjustment module configured to adjust nonlinearity data associated with a characterization gas for the flow sensor with a nonlinearity factor for the process gas to produce gas-adjusted nonlinearity data, the nonlinearity data previously produced in connection with a characterization gas;
    a characterization module configured to:
        produce gas-adjusted characterization data for the flow sensor using the gas-adjusted sensitivity coefficient and the gas-adjusted nonlinearity data; and
        obtain a flow value from the gas-adjusted characterization data using a flow sensor signal from the flow sensor; and
    a controller configured to use the flow value along with a setpoint signal to control a valve of the mass flow controller.

7. The mass flow controller of claim 6 including nonvolatile memory including the sensitivity coefficient, the nonlinearity data, the conversion factor, and the nonlinearity factor.

8. The mass flow controller of claim 6 including an interface component configured to receive the conversion factor and the nonlinearity factor via a network connection.

* * * * *